(12) United States Patent
Siegel

(10) Patent No.: US 9,297,351 B2
(45) Date of Patent: Mar. 29, 2016

(54) CLUSTERING OF CYCLOIDAL WAVE ENERGY CONVERTERS

(75) Inventor: Stefan G. Siegel, Pueblo, CO (US)

(73) Assignee: Atargis Energy Corporation, Pueblo, CO (US)

(*) Notice: Subject to any disclaimer, the term of this patent is extended or adjusted under 35 U.S.C. 154(b) by 655 days.

(21) Appl. No.: 13/569,988

(22) Filed: Aug. 8, 2012

(65) Prior Publication Data

US 2014/0042748 A1 Feb. 13, 2014

(51) Int. Cl.
*F03B 13/18* (2006.01)

(52) U.S. Cl.
CPC ........... *F03B 13/183* (2013.01); *F05B 2230/60* (2013.01); *F05B 2230/70* (2013.01); *F05B 2240/97* (2013.01); *F05B 2270/18* (2013.01); *Y02E 10/38* (2013.01)

(58) Field of Classification Search
CPC .............. F03B 13/183; F03B 13/1825; F05B 2270/18; F05B 2240/97
USPC .......................... 415/3.1; 416/DIG. 4, DIG. 6
See application file for complete search history.

(56) References Cited

U.S. PATENT DOCUMENTS

| | | | |
|---|---|---|---|
| 4,302,161 A * | 11/1981 | Berg | 417/333 |
| 7,686,583 B2 | 3/2010 | Siegel | |
| 7,762,776 B2 | 7/2010 | Siegel | |
| 8,100,650 B2 | 1/2012 | Siegel | |
| 8,581,432 B2 | 11/2013 | Rohrer | |
| 8,604,631 B2 | 12/2013 | Rohrer | |
| 8,614,520 B2 | 12/2013 | Rohrer | |
| 8,686,582 B2 * | 4/2014 | Gardiner et al. | 290/53 |
| 2008/0093859 A1 | 4/2008 | Catlin | |
| 2008/0295509 A1 | 12/2008 | Bernitsas et al. | |
| 2010/0150716 A1 | 6/2010 | Siegel | |
| 2011/0049896 A1 | 3/2011 | Burger et al. | |
| 2012/0248775 A1 * | 10/2012 | Stewart et al. | 290/53 |

FOREIGN PATENT DOCUMENTS

CN 202300816 U 7/2012

* cited by examiner

*Primary Examiner* — Craig Kim
*Assistant Examiner* — Adam W Brown
(74) *Attorney, Agent, or Firm* — David Millers

(57) ABSTRACT

A wave energy conversion system uses a pair of wave energy converters (WECs) on respective active mountings on a floating platform, so that the separation of the WECs from each other or from a central WEC can be actively adjusted according to the wavelength of incident waves. The adjustable separation facilitates operation of the system to cancel reactive forces, which may be generated during wave energy conversion. Modules on which such pairs of WECs are mounted can be assembled with one or more central WECs to form large clusters in which reactive forces and torques can be made to cancel. WECs of different sizes can be employed to facilitate cancelation of reactive forces and torques.

26 Claims, 7 Drawing Sheets

US 9,297,351 B2

CLUSTERING OF CYCLOIDAL WAVE ENERGY CONVERTERS

FEDERALLY SPONSORED RESEARCH OR DEVELOPMENT

This invention was made with government support under Contract No. DE-EE0003635 awarded by the Department of Energy. The government has certain rights in the invention.

BACKGROUND

Wave energy converters can convert energy from ocean waves into more easily used forms of energy such as electricity. For example, one type of wave energy converter is a cycloidal wave energy converter (CycWEC), which typically employs one or more hydrofoils that are parallel to a central shaft and connected to the central shaft by lever arms. Waves passing through a CycWEC cause water flows that interact with the hydrofoils, creating lift that rotates the foils and the central shaft. A convention electrical generator can then convert the energy in rotation of the central shaft into electrical energy. For best operation, a wave energy converter generally needs to be positioned in the ocean at an appropriate depth and oriented in a direction that is appropriate to the current pattern of ocean waves. Such wave energy converters may also need to be secured in some fashion that prevents unwanted motion of the converters but permits adjustment to accommodate changes in the ocean waves. A mooring for a wave energy converter may also need to allow for protection of the wave energy converter during storms or high seas, provide for repair or replacement of a wave energy converter, and cause only acceptable environmental changes.

SUMMARY

In accordance with an aspect of the invention, Cycloidal Wave Energy Converters (CycWECs) can be deployed in the open ocean systems in a fashion where the reactive forces imposed on moorings that connection CycWECs to the sea floor or elsewhere are either minimized or entirely eliminated. One example CycWEC system links multiple CycWECs into a module and joins multiple modules into a cluster. Each CycWEC has one or more blades with adjustable pitch that may be controlled by a computer or other mechanism. In particular, the pitch of such blades can be controlled and operated not only to extract energy from ocean waves but also to control reactive forces that the ocean waves apply to the CycWEC. A cluster of linked CycWECs may additionally have relative spacing that a control system may adjust according to the current wave behavior. CycWECs in a deployed cluster can be collectively operated, e.g., through control of pitching cycle and relative spacing, to reduce the net force on the cluster and accordingly minimize mooring requirements for the cluster.

In accordance with another aspect of the invention, an arrangement of modules in clusters can improve operability of CycWECs in an ocean environment by facilitating maintenance of the units at sea or on shore while still permitting operation of functional units.

BRIEF DESCRIPTION OF THE DRAWINGS

Use of the same reference symbols in different figures indicates similar or identical items.

DETAILED DESCRIPTION

A cycloidal wave energy converter (CycWEC) can include one or more hydrofoils or blades, which rotate around a central or drive axis while being attached eccentrically at a distance from the central axis. In operation, the CycWEC may be entirely submerged below the water surface to interact with the waves through the lift that the hydrofoils produce as waves pass. While submersion of a CycWEC is advantageous in terms of avoiding excessive loads that winds or breaking waves during a storm may impose on moorings holding the CycWEC in place, a submerged CycWEC can be more difficult to access for servicing. In addition, a side effect of the conversion of wave energy to shaft power is both a drive torque turning the central shaft and generator, as well as a force perpendicular to the central shaft that lift and drag forces on the hydrofoils generate. Since one desirable configuration for a CycWEC employs an opposing pair of the hydrofoils operated with pitch angles of equal magnitude but opposite sign, the combined reactive forces at the generator shaft can be about twice the lift and drag force of a single hydrofoil. This force can change in direction in synchronization with the rotation of the CycWEC, and mounting and mooring systems may need to sustain the reactive forces in order to hold the CycWEC in place. In an open ocean environment, where the ocean floor may be hundreds or more meters below the surface, this mounting requirement can pose a significant engineering challenge. As described herein, a cluster of CycWECs can use hydrofoils of different sizes and can permit adjustment of CycWEC spacing to improve cancellation of reactive forces and torques. Further, the cluster can be constructed using modules that facilitate maintenance and deployment of the CycWECs.

Figure 1A:
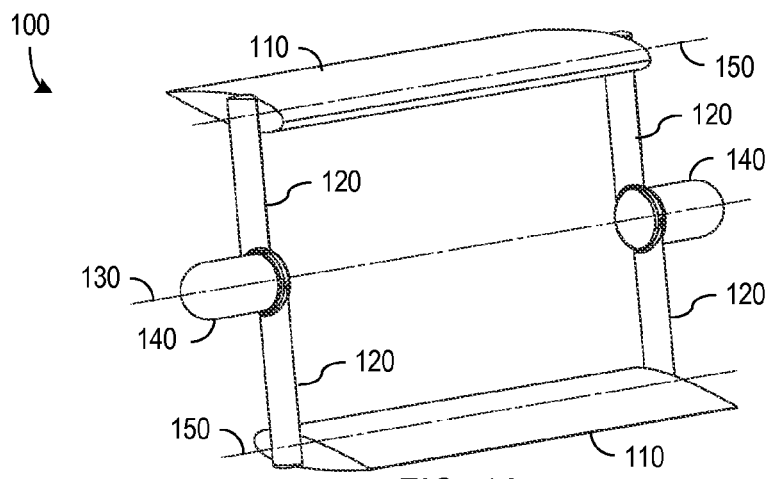
FIGS. 1A, 1B, and 1C show examples of cycloidal wave energy converters.

FIG. 1A shows an example of a CycWEC 100 having eccentrically offset hydrofoils or blades 110. In the illustrated embodiment, CycWEC 100 includes an opposing pair of blades 110, but more generally, a CycWEC could employ one or more blades 110. Each blade 110 is mounted on a pair of struts or arms 120 that provides a radial offset of the blade 110 from a drive axis 130 of CycWEC 100. Radial arms 120 can rotate about axis 130, e.g., as a result of forces that ocean waves apply to blades 110, and arms 120 are connected to drive one or more electrical generators 140 capable of producing electrical power from the rotation of blades 110. Blades 110 are also able to rotate about respective pitch axes 150. For example, a computer system (not shown) operating an actuation system that may be provided in arms 120 or blades 110 can control pitch rotation of blades 110 about respective axes 150 as arms 120 rotate about drive axis 130. Rotations about pitch axes 150 can vary the pitch of blades 110 as blades 110 rotate about drive axis 130. The variation in the pitch may be periodic with a period selected according to the period of rotation arms about axis 130, and the variation of the pitch of a blade 110 is sometimes referred to herein as the pitching cycle of the blade 110. The particular pitching cycles used at any particular time in a CycWEC such as CycWEC 100 can be selected to achieve different performance objectives. For example, U.S. Pat. No. 7,762,776, entitled "Vortex Shedding Cyclical Propeller" describes how a pitching cycle can be selected for efficient conversion of wave energy, and U.S. Pat. No. 8,100,650 describes how pitching cycles can be selected to control reactive forces encountered during conversion of wave energy. In one operating mode, the pitch cycle for a blade 110 holds the blade 110 at a constant pitch angle that can be selected according to characteristics of incoming waves. U.S. patent application Ser. No. 13/405,267, entitled "Efficient Wave Energy Conversion using Cycloidal Turbines," further describes efficient operation of CycWEC using a constant pitch angles and is hereby incorporated by reference in its entirety.

Figure 1B:
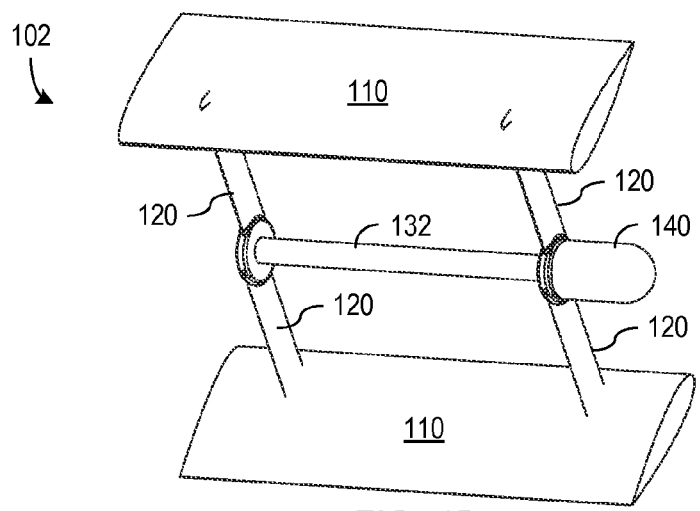
Figure 1C:
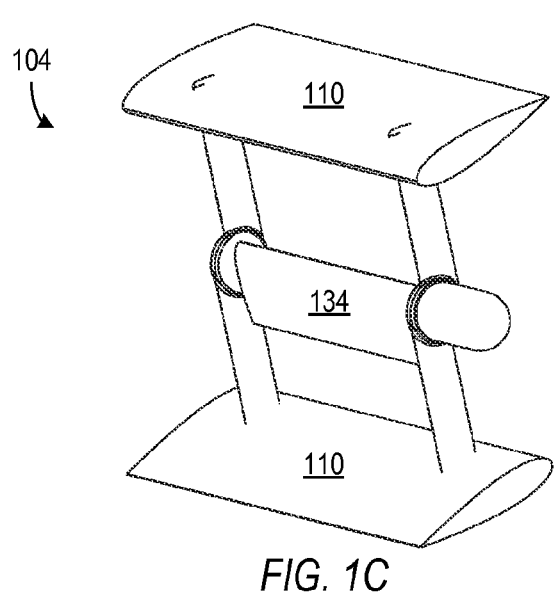

FIGS. 1B and 1C illustrate alternative CycWECs 102 and 104 that illustrate a few of the variations that may be employed in different CycWECs. For example, a CycWEC can drive one or multiple generators 140 in order to convert ocean wave energy to electricity. CycWEC 100 of FIG. 1A drives the shafts of two generators 140. CycWEC 102 of FIG. 1B drives a single generator 140 and includes a drive shaft 132 along central axis 130 to better transfer rotational energy to a single generator 140. Further, although generators 140 are directly attached to arms 120 or drive shaft 132, more generally generators 140 or other converters can be connected through a transmission (not shown) that may allow remote positioning of generators 140 or other energy converters. CycWEC 104 of FIG. 1C illustrates use of a shaft hydrofoil 134 that is rotatable about the drive axis independent from rotation of the drive shaft. Hydrofoil 134 can be operated and oriented, for example, to create reactive forces that tend to balance or cancel the reactive forces on hydrofoils 110. A further advantage of hydrofoil 134 is that hydrofoil 134 may improve the overall efficiency of CycWEC 104 over a CycWEC 102 having a round or cylindrical shaft 132 because hydrofoil 134 can prevent flow separation of the wave induced flow that may occur at shaft 132.

Figure 2A:
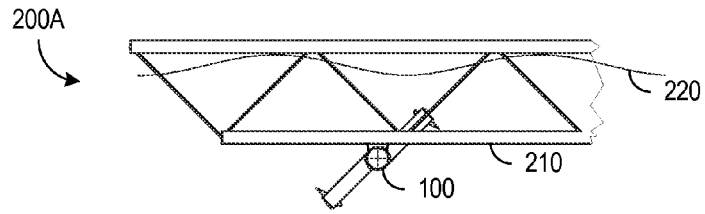
FIGS. 2A and 2B respectively illustrate a floating deployment and a submerged deployment of a module on which cycloidal wave energy converters are mounted.
Figure 2B:
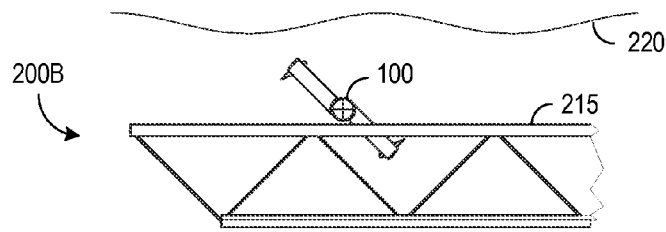

A CycWEC such as shown in FIGS. 1A, 1B, and 1C may require mounting and mooring structures for ocean deployment. Co-filed U.S. patent application Ser. No. 13/570,018, entitled "Ocean Mounting of Wave Energy Converters," which issued as U.S. Pat. No. 8,937,395 and is hereby incorporated by reference in its entirety, describes some mounting or mooring structures for deploying wave energy converters. FIGS. 2A and 2B illustrate two alternative deployments of a CycWEC 100. In a deployment 200A of FIG. 2A, CycWEC 100 is mounted on a platform 210 that floats so that at least a portion of platform 210 remains above the surface 220 of the ocean. Platform 210 may, for example, be constructed using sealed tubes, pipes, or hollow compartments that can be filed with a mixture of buoyant material (e.g., air) and ballast material (e.g., water) to control how high platform 210 rides in the water. The depth of CycWEC 100 generally must be sufficient to submerge the blades of CycWEC 100. For example, CycWEC 100 may be fully submerged. The depth of CycWEC 100 can be adjusted in the deployment of FIG. 2A, for example, by pumping air or water into platform 210 to adjust how high the top of platform 210 rides above ocean surface 220.

FIG. 2B illustrates a deployment 200B of CycWEC 100 on a platform 215 that is fully submerged beneath ocean surface 220 at a depth that submerges blades of CycWEC 100 below ocean surface 220. Platform 215 can be held at a desired depth using a variety of techniques. For example, platform 215 may be of similar or identical construction as platform 210 but filled with a mixture air and ballast that gives platform 215 nearly neutral buoyancy. A mooring or tethering system (not shown) could also be used to hold platform 215 at the desired depth. The control of reactive forces on the blades of CycWEC 100 can also be used to actively hold platform 215 at or move platform 215 to a desired depth. For example, the depth of CycWEC 100 can be monitored, and a control system or feedback loop can alter a pitching cycle of the blades of CycWEC 100 to produce a reactive force that tends to push platform 215 to a desired depth for CycWEC 100.

Deployment 200B may have some advantages over deployment 200A. In particular, deployment 200B can fully submerge platform 215 and CycWEC 100, which may reduce the effects of storm conditions such as wind or crashing waves. Deployment 200B may also provide a greater range of adjustment of the depth of CycWEC 100. In general, an optimal or desirable depth for CycWEC 100 may depend on wave conditions such as the size or amplitude of the waves, and deployment 200B may permit use of CycWEC 100 at a greater range of depths. Also, deployment 200B allows mounting of CycWEC 100 on the top or an upper portion of platform 215, so that if maintenance is needed, platform 215 may be pumped full of air or otherwise brought to surface 220, exposing CycWEC 100 to above water for maintenance.

Reactive forces perpendicular to the drive axes of a CycWEC can arise as described above due to lift and drag from water flows across the surfaces of the CycWEC. In accordance with an aspect of the current invention, a cluster including multiple CycWECs can be configured and operated to control the reactive forces. For example, reactive forces can be controlled so that the net reactive force and the net reactive torque on a cluster is zero or nearly zero. Cancelation of reactive forces and torques is particularly useful for minimizing the required capabilities of moorings that hold a cluster of CycWECs. Alternatively, the reactive forces can be controlled to move the cluster in a desired manner, e.g., to control the depth of CycWECs in the cluster, rotate the cluster to adjust to the direction of a wave front, or transport the cluster.

Figure 3:
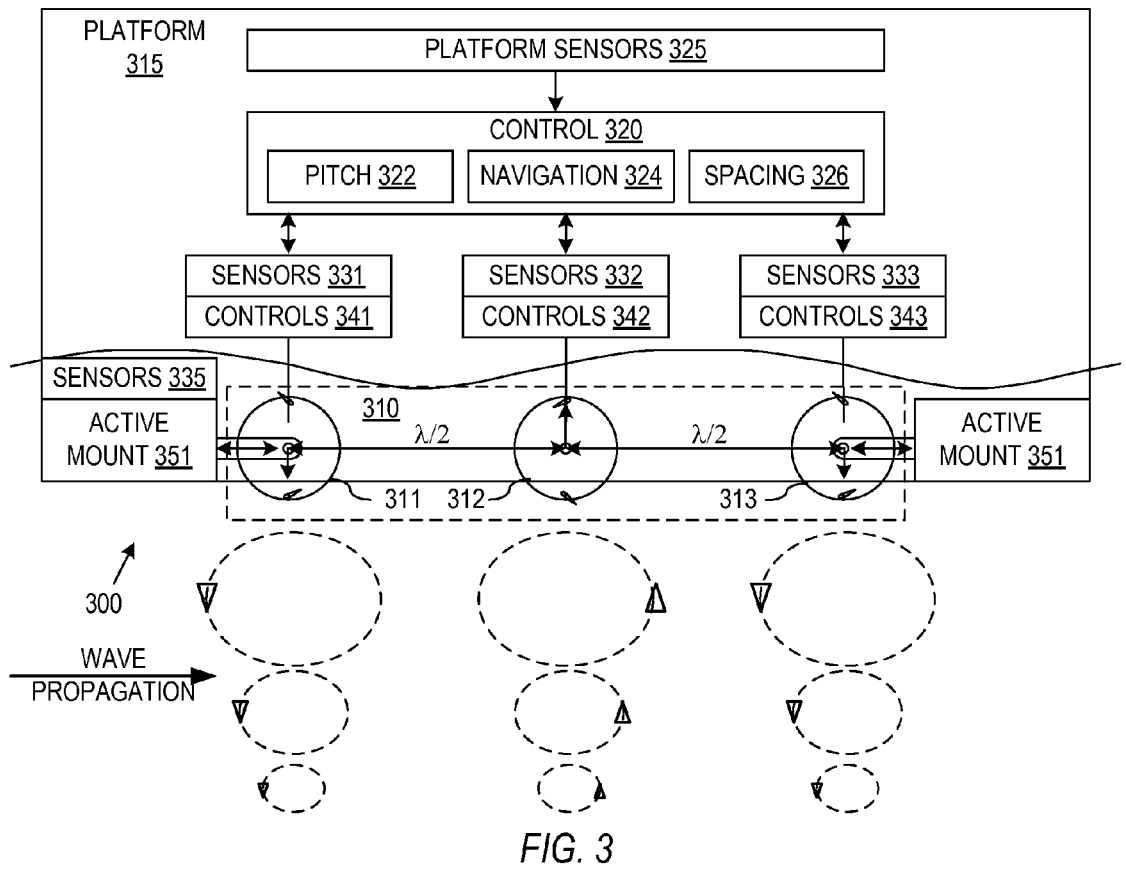
FIG. 3 is a block diagram of a system containing a cluster of wave energy converters arranged for cancelation of reactive forces and torques during conversion of wave energy.

FIG. 3 illustrates a system 300 including a cluster 310 of CycWECs that are mounted on a platform 315 and arranged for operation in which reactive forces and torques on platform 315 cancel. Cluster 310 in the example of FIG. 3 includes three CycWECs 311, 312, and 313, but as described further below, clusters containing different numbers of CycWEC can be similarly operated to cancel or control reactive force. In the embodiment of FIG. 3, CycWECs 311, 312, and 313 are arranged in series or in line along a direction of wave propagation, so that blades of all CycWECs 311, 312, and 313 may be positioned parallel to the wave fronts of incoming waves.

Waves passing by or over a CycWEC, e.g., over cluster 310, generally cause periodic water flows with a period T equal to the period of the waves. The period T is the ratio of the wavelength λ to the wave velocity or celerity c, i.e., T=λ/c. In general, incident waves in an ocean are subject to fluctuations and may trend to longer or shorter wavelengths over time. However, the approximation of a periodic, e.g., sinusoidal waves, with a definite period may be accurate or at least a valid approximation over a number of incident waves.

A control system 320, which may be or include a general-purpose computer system executing appropriate software, can employ sensors 331, 332, and 333 to sense water flows in respective CycWECs 311, 312, and 313 and employ control systems 341, 342, and 343 to independently control the pitch of blades in respective CycWECs 311, 312, and 313. The pattern of variation of the pitch of a blade or hydrofoil in a CycWEC is often referred to herein as a pitching cycle, and the pitching cycle employed for a particular blade will often be periodic with a period equal to or dependent on the period of the incoming waves. However, a selected pitching cycle could maintain the blades at a constant angle that may be selected according to wave characteristics and only changed when a characteristic such as wavelength or amplitude of incoming waves changes. In the illustrated embodiment, control system 300 includes a pitch unit 322 that calculates or selects pitching cycles for the blades in CycWECs 311, 312, and 312 based on factors such as the current wave conditions, the configurations of CycWECs 311, 312, and 313 in cluster 310, the position and orientation of platform 315, and the rotation angles of CycWECs 311, 312, and 313. Typically, one or more sensors 335 at the up-wave end of platform 315 can measure properties of the incoming wave such as the direction, height, and period. Sensors 335 may also be independent from platform 315 and located on a separate float or on the ocean floor, to avoid interference from CycWECs 311, 312, and 313 on to these measurements, and provide early advance information about the incoming waves to control system 320. A platform sensor 325 may measure more global operating parameters associated with platform 315 such as the depth, position, orientation, movement, or acceleration of platform 315 or environmental conditions such as wind speed and wave conditions at platform 315. Sensors 331, 332, and 333 may be associated with particular CycWECs 311, 312, and 313 and measure local conditions such as water speeds and rotation angles of respective CycWECs 311, 312, and 313. Pitch unit 322 may use measurements from sensors 325, 331, 332, 333, and 335 when selecting pitch cycles for blades of CycWECs 311, 312, and 313. In general, the pitching cycles can be selected not only for wave energy conversion but also to control reactive forces in cluster 310 and achieve desired operation of system 300. For example, a navigation unit 324 can be included in control system 320 to determine the desired position, orientation, and depth of platform 315 based on factors such as wave conditions or user instructions, and pitch unit 322 may select pitching cycles for individual CycWECs 311, 312, and 313 or individual blades so that net reactive forces move platform 315 toward or maintain platform 315 at the desired position, orientation, and depth. This is important since the platform generally needs to be oriented such that the CycWEC blades are parallel with the incoming wave crests for optimal wave energy conversion. Thus, sensor information about the direction of the incoming waves can be used to determine a need for rotation of the platform about the vertical axis, and the control system for blade pitch 322 may then be used to create a residual force rotating the platform. If platform 315 is starting to drift off the desired position, navigation unit 324 can issue pitch commands to CycWECs 311, 312, and 313 creating a force countering the drift. Thus, the entire platform 315 may be actively stabilized in position and rotation.

Reactive forces on cluster 310 may need to completely or partially cancel to achieve a desired net reactive force on platform 315. Cancelation of reactive forces and torques on platform 315 can be facilitated by spacing CycWECs 311, 312, and 313 at a half wave length (λ/2) separation and adjusting the fraction of the wave power being converted to shaft power by each CycWEC 311, 312, 313 or each blade. For example, for complete cancelation, the reactive force due to the hydrofoil lift in each of CycWEC 311 and 313 can be controlled to be one half the hydrofoil lift in the center CycWEC 312. Further, in one operating mode, CycWECs 311, 312, and 313 have fixed pitch angles and rotate with the same frequency, which is the frequency of the incoming waves, and CycWEC 312 is operated 180° out of phase with CycWECs 311 and 313. Such operation cancels the net reactive force and the net reactive torque on platform 315 for all rotation angles of CycWECs 311, 312, and 313. The desired phase difference between the reactive force on CycWEC 312 and CycWECs 311 and 313 can be achieved if CycWEC 312 is separated from CycWEC 311 and 313 by one half of the wavelength of the incident waves, so water flows and rotation angle at CycWEC 312 are 180° out of phase with water flows and rotation angles at CycWECs 311 and 313. The spacing of CycWECs 311, 312, and 313 may need to be adjusted to maintain a desired phase relationship between reactive forces on CycWECs 311, 312, and 313 if the wavelength λ of the incident waves changes. Platform 315 includes active mountings 351 and 353 respectively for two CycWECs 311 and 313. Active mountings 351 and 353 may included motors or actuators in mechanical systems configured to move CycWECs 311 and 313 toward or away from central CycWEC 312 along an axis, e.g., along the wave propagation direction. Control system 320 may include a spacing unit 326 for control of active mountings 351 and 353 based on measurements of current wave conditions, e.g., based on the wavelength of the current wave pattern.

Figure 4A:
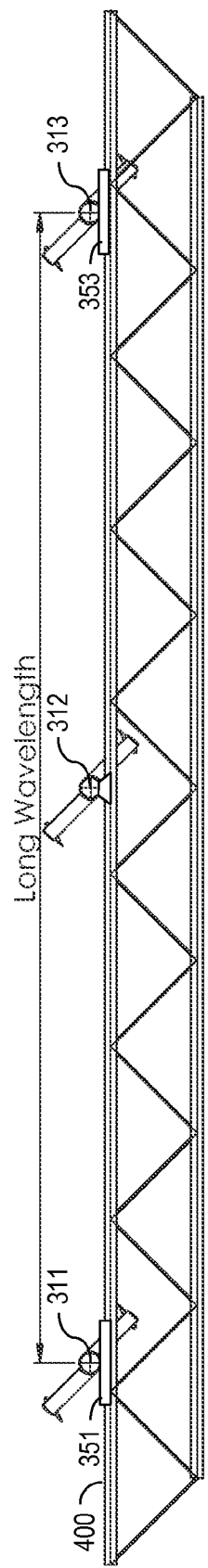
FIGS. 4A and 4B shows a module that permits the spacing of an in-line pair of wave energy converters to be adjusted according to the wave length of ocean waves.
Figure 4B:
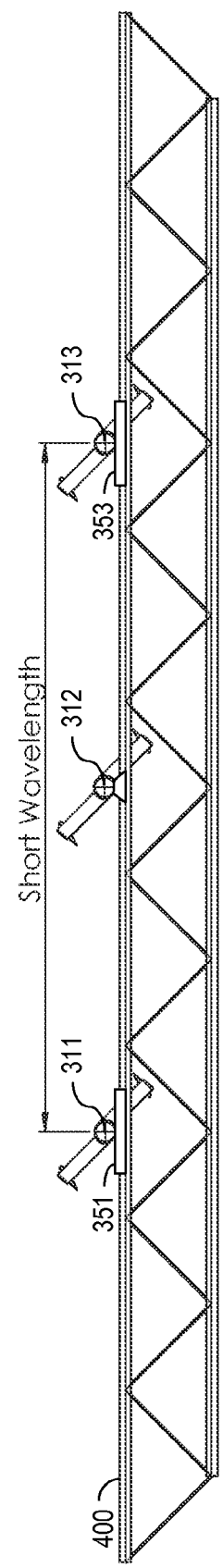

FIGS. 4A and 4B illustrate a module 400 on which CycWECs 311, 312, and 313 may be mounted. Module 400 may include a pair of bending beams or trusses constructed from pipes or hollow members that can be filled with a mixture of ballast material (water) and buoyant material (air) that gives platform 400 an overall desired buoyancy. Central CycWEC 312 may have a fixed mounting that maintains CycWEC 312 at a fixed location on the platform 400, e.g., at the center of platform 400. For a cluster using an in-line arrangement of three CycWECs, central CycWEC 312 is mounted in-line with CycWECs 311 and 313 on platform 400, but in alternative cluster configurations, the central CycWEC may be offset in a direction perpendicular to the wave propagation direction as described further below. Outer CycWECs 311 and 313 may be attached to platform 400 through respective active mountings 351 and 353. Each active mounting 351 or 353 can be implemented on platform as a motorized system of tracks and slides. A typical motorized drive system may consist of a gear motor with a pinion gear attached to its shaft, which engages in a linear gear rack as a rack-and-pinion drive system to adjust the position of units 311 and 313. Accordingly, when incident waves have a long wavelength, CycWECs 311 and 313 can be moved out as shown in FIG. 4A to positions that provide a separation equal to the long wavelength, and when incident waves have a short wavelength, CycWECs 311 and 313 can be moved as shown in FIG. 4B to positions where the separation of CycWECs 311 and 313 is equal to the short wavelength. Two active mounts 351 and 353 are used so that the separation from each outer CycWEC 311 or 313 to center CycWEC 312 may be half of the wavelength of the waves. As will be understood, many other systems for moving two or more of CycWECs 311, 312, and 313 can be used to adjust the spacing of CycWECs 311, 312, and 313. In an even simpler implementation, the component of the lift force of the hydrofoils in the direction of the tracks can provide the propulsive force to move WECs 311, 312, or 313 along a track. In which case, only a braking system (not shown) is needed to stop the movement of CycWECs 311, 312, or 313 when the desired new position has been reached, which will also fix CycWECs 311, 312, or 313 in the new position.

Control system 320 of FIG. 3 can actively control or tune the relative amplitudes of the reactive forces on CycWECs 311, 312, and 313 through control of the pitching cycle. For example, control system 320 can employ the same or different constant pitch angles for CycWECs 311, 312, and 313 and introduce and control perturbations of an otherwise fixed pitch angle for the blades in CycWECs 311, 312, or 313. However, control of the relative sizes of CycWECs 311, 312, and 313 provides passive control of reactive forces. For example, the blade area of central CycWEC 312 may be twice the blade area of CycWEC 311 or 313, in which case, the amplitude of the reactive force on central CycWEC 312 will tend to be twice the amplitude of the reactive force on an individual outer CycWEC 311 or 313. Such a configuration is particularly useful because selecting pitching cycles to maximize wave energy conversion in CycWECs 311, 312, and 313 may also cause cancelation of reactive forces and torques. According, cluster 310 of CycWECs can be operated for maximal energy conversion efficiency without creating large reactive forces that must ultimately be borne by a mooring system (not show) for platform 315.

The serial arrangement of three CycWECs may cause complications due to the way in which shaft power and hydrofoil lift are related. In general, the reduction in the height or amplitude of a wave passing through a wave energy converter is proportional to hydrofoil lift in the wave energy converter, but the wave energy is quadratically related to the change in wave height. As a result, waves incident on the last CycWEC in a series may be substantially reduced in energy. For example, in FIG. 3 with central CycWEC 312 twice the size of CycWEC 311 or 313 and the same pitch angle used for each CycWEC 311, 312, and 313, up-wave CycWEC 311 may extract about 43.75% of the incoming wave energy, and center CycWEC 312 may extract 50% of the wave energy, leaving down-wave CycWEC 313 to extract the remaining 6.25% of the incoming wave power. In a typical setting, this amount of wave power may not be sufficient to cover the frictional losses at the blades, and thus the down wave WEC 313 may need to be motored in order to maintain rotation for reactive force cancelation. Furthermore, the overall wetted surface area and associated viscous losses of the hydrofoils of three CycWECs 311, 312, and 313 can be several times that of a single WEC that may be operated to extract the wave energy. Thus, while achieving the desired force cancellation, an in-line cluster 310 such shown in FIG. 3 may not be efficient.

Figure 5A:
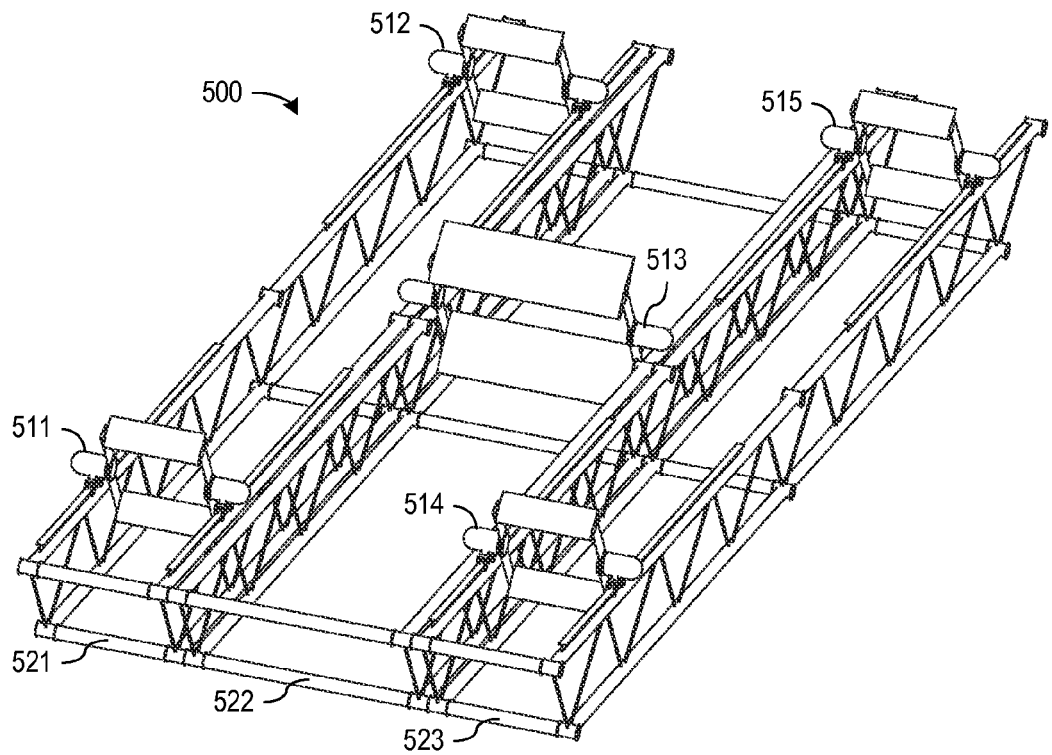
FIG. 5A shows perspective view of a cluster including five wave energy converters arranged for cancelation of reactive forces and torques.
Figure 5B:
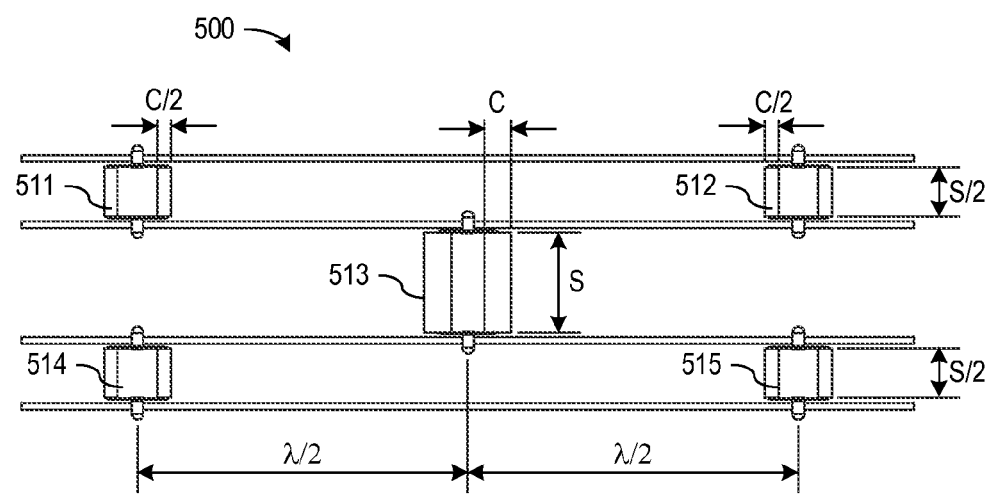
FIG. 5B show a top view of the cluster of FIG. 5A and illustrates a configuration in which the relative sizes of the wave energy converters differ to facilitate cancelation of reactive forces and torques during conversion of wave energy

FIG. 5A shows a perspective view of a cluster 500 containing five WECs 511 to 515 that are spread out along the direction perpendicular to wave propagation. In particular, instead of arranging WECs 511 to 515 in line, WECs 511 and 512 and WECs 514 and 515 have been relocated to the left and right side of center WEC 513. WECs 511 to 515 have also been modified in terms of their respective span and hydrofoil chords. For example, as shown in FIG. 5B, each of WEC 511, 512, 514, and 515 has a cord C/2 that is half of the cord C of center WEC 513, and each of WEC 511, 512, 514, and 515 has a span S/2 that is half of the span S of center WEC 513. As a result, assuming similar construction, e.g., the same number of blades, the hydrofoil area of WECs 511, 512, 514, and 515 is one quarter the hydrofoil area of central WEC 513, and the amplitude of the reactive force on each of WECs 511, 512, 514, and 515 would tend to be one quarter of the amplitude of reactive force on WEC 513 if WECs 511 to 515 are operated in the same manner in the same wave conditions. For example, if all of WECs 511 to 515 use the same pitch angle, which may be selected according to the wave amplitude. As long as the proper full wave length spacing between up-wave WECs 511 and 514 and respective down-wave WECs 512 and 515 is maintained, cluster 500 can be balanced in terms of reactive forces and torques caused by the hydrofoils in WECs 511 to 515.

Each of the four smaller WECs 511, 512, 514, and 515 can be operated to create one quarter the lift of center WEC 513 (due to being designed with half span and half chord), and with the natural phase difference created by the λ/2 spacing, the lift that center WEC 513 creates will be 180° out of phase with the lift that WECs 511, 512, 514, and 515 create. The support beams of modules 521, 522, and 523 on which WECs 511 to 515 are mounted transmit the forces between all five WECs 511 to 515, and are thus acting as bending beams. An efficient implementation of each module 521, 522, and 523 as the depicted in FIG. 5A is a truss beam with a top and bottom tension and compression member, joined by a diagonal shear web. However, any other structure able to bear the bending moment can be substituted.

FIG. 5B illustrates how outer WECs 511, 512, 514, and 515 that can be reduced in size by shortening the span and chord of WECs 511, 512, 514, and 515 to reduce hydrofoil areas. Hydrofoil area can also be reduced by other combinations of reducing span and chord, rather than the equal 50% reduction shown. The exact choice of implementation of smaller hydrofoils may be driven by both operational and cost of construction considerations. Further, the generated lift can be changed using other techniques. For example, if all of WECs 511 to 515 are the same size, reducing the amplitude of the pitching cycle of a blade in an outer WEC 511, 512, 514, or 515 that has the same area as center WEC 513 can reduce the lift and resulting reactive forces. While this would achieve force cancellation, the implementation of FIG. 5B may provide better conversion efficiency since making WECs 511, 512, 514, and 515 smaller reduces hydrofoil surface areas are and thus reduces frictional losses. Thus, the reduced lift force by reducing hydrofoil area may preferable to reducing lift forces by altering the pitch angle or pitching cycles.

Cluster 500 when compared to an in-line cluster having the same hydrofoil area may receive more incoming wave power due to the fact that cluster 500 can provide twice the overall span-wise extent. The combined wetted surface area of the hydrofoils at any span-wise location is exactly that of a single full-size WEC, which indicates that the losses due to skin friction will be the same as those for a single WEC that is the same size as WEC 513. This may constitute a major improvement in terms of overall conversion efficiency. Cluster 500 also reduces the number of sequential components used for force and torque cancelation. In particular, an in-line configuration uses three WECs in series to achieve force cancellation, but cluster 500 only averages 1.5 WECs in series at each span wise location.

The positioning of WECs 511 to 515 laterally along a wave crest is also desirable for control of the orientation of cluster 500. In particular, as described above, it is generally desirable for the blades of each of WECs 511 to 515 to be aligned parallel to incoming wave crests. A control system for cluster 500, e.g., a system such as control unit 320, which includes a pitch unit 322 and a navigation unit 324, can measure incoming waves and if the orientation of cluster 500 does not position the blades of WECs 511 to 515 with a desired orientation, e.g., parallel to the current wave crests, control unit 320 and pitch unit 322 can make the pitch cycles of left WECs 511 and/or 512 different from the pitch cycles of right WECs 514 and/or 515. For example, WEC 511 or 512 may temporarily operate with a fixed pitch angle that is different from a fixed pitch angle used on the blades of WEC 514 or 515. The wave energy conversion process could then cause reactive forces or torques that rotate cluster 500 so that the blades of WECs 511 to 515 are better aligned to the current wave conditions.

Figure 6A:
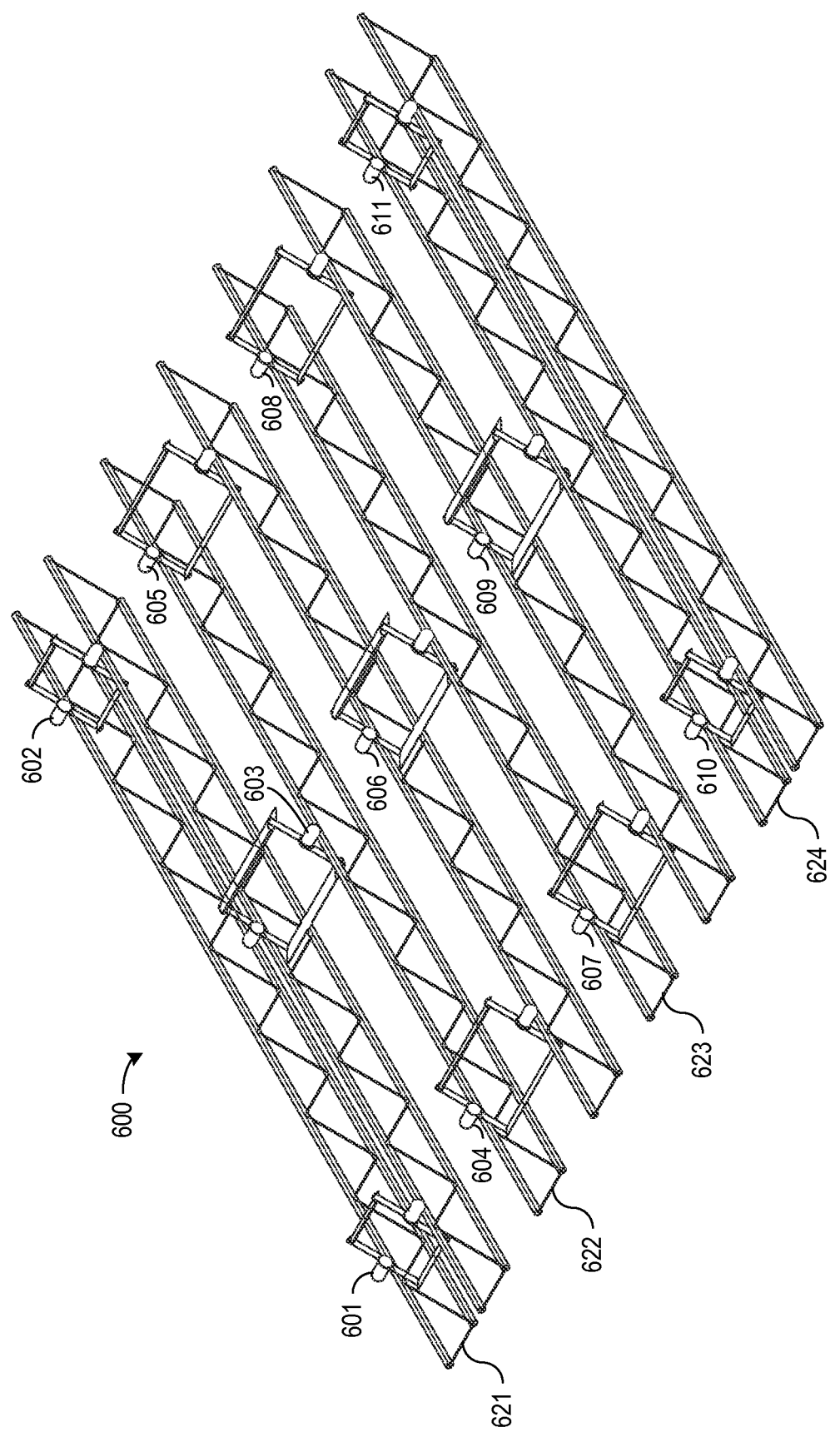
FIG. 6A shows a cluster including eleven wave energy converters arranged for cancelation of reactive forces and torques.

Cluster 500 of FIG. 5A provides a relatively compact system that achieves reactive force and torque cancellations. However, principles employed in cluster 500 can be expanded by adding more WECs in the span wise direction. FIG. 6A shows a cluster 600 including eleven WECs 601 to 611. In particular, cluster 600 includes WECs 601, 602, 604, 605, 607, 608, 610, and 611 forming four in-line pairs of WECs and includes three central WECs 603, 606, and 609. Each in-line pair of WECs is mounted on active mountings that permit adjustment of the position of WECs 601, 602, 604, 605, 607, 608, 610, and 611 to be one half wavelength ($\lambda/2$) from a center of a truss or bending beam on which the WEC is mounted. WECs 601 to 611 are thus arranged in three rows with an up-wave row including WECs 601, 604, 607, and 610, a center row including central WECs 603, 606, and 609, and down-wave row including WECs 602, 605, 608, and 611. In normal operation, the rows may be separated by one half of the wavelength of the incident waves.

Figure 6B:
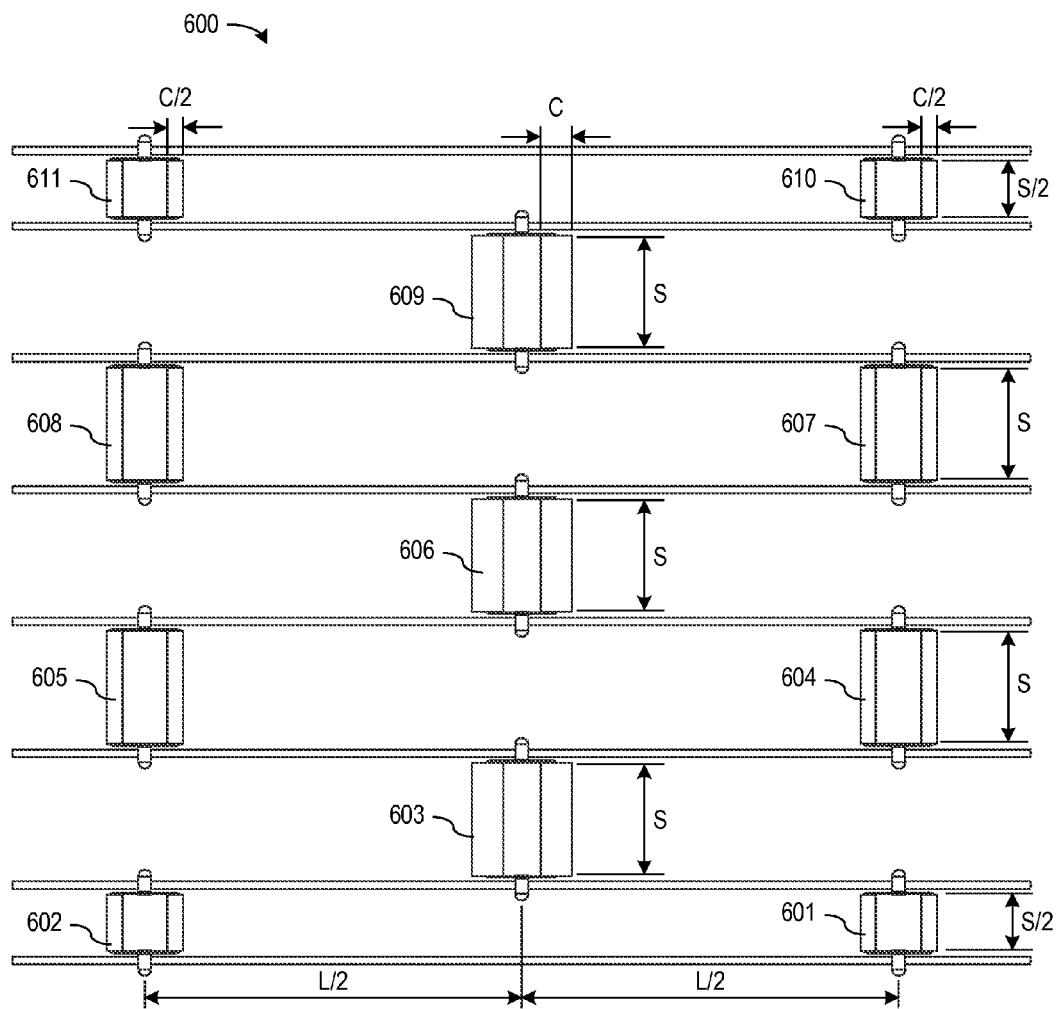
FIG. 6B illustrates how the sizes of wave energy converters in the cluster of FIG. 6A may differ to facilitate reduction of net reactive force and torques.

WECs 601 to 611 may be sized or operated differently to provide passive or active control of reactive forces. In particular, two in-line pairs 601, 602 and 610, 611 that are at left and right edges of cluster 600 may be sized or operated to create reactive forces having an amplitude that is one quarter of the amplitude of the reactive force on one central WEC 603, 606, or 609. In-line pairs 604, 605 and 607, 608 that are not at the edges of cluster 600 may be sized or operated to create reactive forces having an amplitude that is one half of the amplitude of the reactive force on one central WEC 603, 606, and 609. FIG. 6B illustrates that a configuration of cluster 600 that varies the areas of the hydrofoils to passively provide the desired relationships of the reactive forces on WECs 601 to 611. In particular, edge WECs 601, 602, 610, and 611 have hydrofoils with chord lengths (C/2) and spans (S/2) that are respectively half the size of the chords (C) and spans (S) of central WECs 603, 606, and 609. Other in-line WECs 604, 605, 607, and 608 use hydrofoils with spans (S) that are the same as the span (S) of central WECs 603, 606, and 609 and chords (C/2) that are half the size of the chords (C) of central WECs 603, 606, and 609. Many other combinations are possible to achieve the same force ratios. With this configuration, cluster 600 can cancel reactive forces and torques and effectively acts as three attached clusters of five WECs. However, cluster 600 has the advantage of requiring fewer bending beams, and all but the WECs 601, 602, 610, and 611 in the outer edges of cluster 600 have the same span (S).

Clusters of WECs that provide force and torque cancelation can be extended to include a central row including any number N of full-size WECs. In general, a cluster including a row of N central WECs further includes (N+1) in-line pairs. Each in-line pair may have actively adjustable separation as described above, so that WECs in the in-line pairs form two rows of WECs with each row separated from the central row by a distance of half a wavelength. The two in-line pairs at the edges of the cluster can be sized or operated to provide reactive force with an amplitude that is one quarter of the amplitude of the reactive force on the central WECs, and the internal in-line pairs that are not at the edges of the cluster can be sized or operated to provide reactive force with an amplitude that is one half of the amplitude of the reactive force on the central WECs. The number N of central WECs in a cluster can be increased indefinitely and maintain force cancellation while the overall power output increases nearly linearly with the number N.

Figure 7:
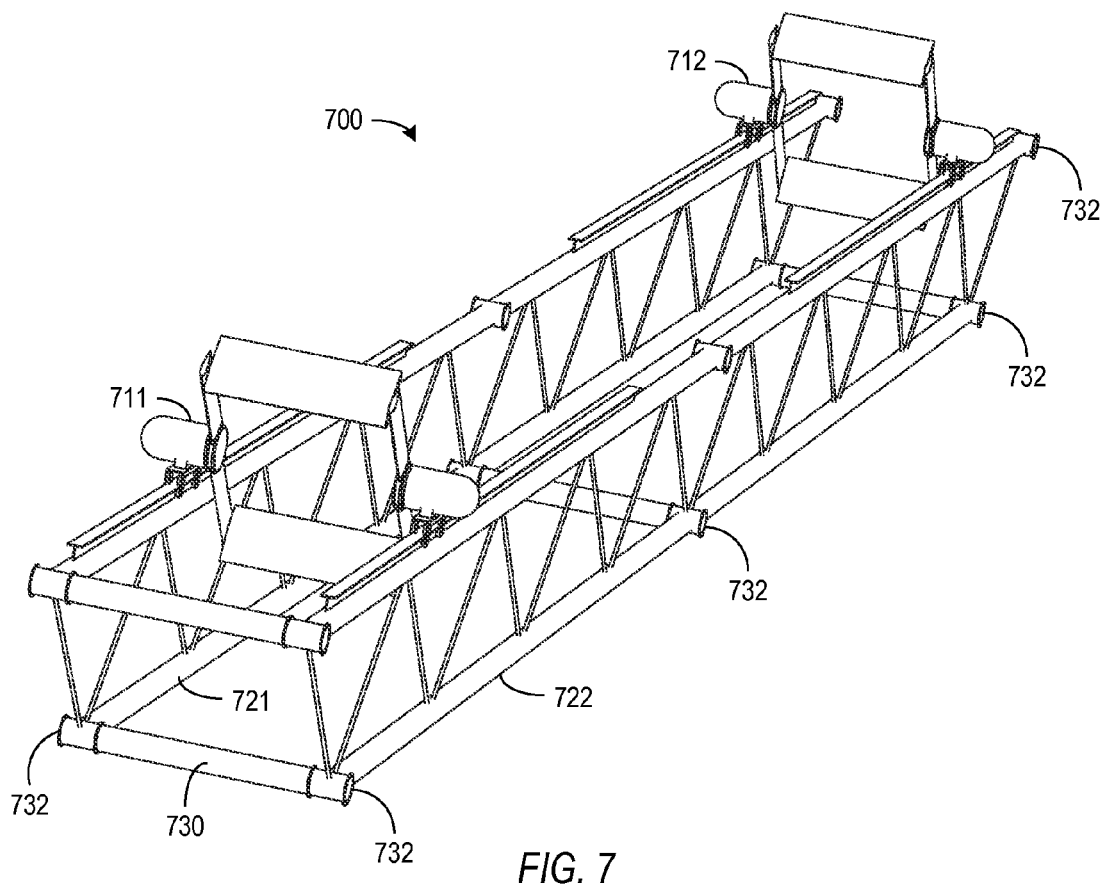
FIG. 7 shows a perspective view of wave energy converters on a module that can be combined with other modules to create a cluster of wave energy converters.

Assembling a cluster of individual WECs mounted on bending beams can be a challenge for small clusters and may become infeasible for larger clusters, particularly if assembly is to take place in the open ocean in the presence of rough seas. A modular arrangement of wave energy converters on frames can be used to simplify the deployment process. FIG. 7 for example shows a module 700 on which an in-line pair of WECs 711 and 712 are actively mounted. Module 700 includes two truss beams 721 and 722 that have been joined by a number of spacers 730 to form a stable frame that securely holds WECs 711 and 712. On both sides of the frame, connection points 732 are provided for joining several of similar modules together to form a cluster. For example, a central WEC may be mounted on a similar module that connects to connection points on a side of module 700. In FIG. 7, each side of module 700 has six connection points, but this number may be adjusted up or down to accommodate different structural or other requirements. Connection points 732 may be as simple as a flange with bolts but may also be used to house connectors for electrical power and data connections. Connection points 732 may connect through structures that provide a rigid connection in all directions or alternatively structures that allow for swivel in one or more directions, which may be advantageous for reducing bending loads in the span wise direction in large clusters. Connection points 732 could also include self-aligning and self-joining structures, which may be motorized and operable to engage mechanical locks, so that no direct human interaction is necessary for docking or undocking two modules from/with each other.

The connection of modules may further include inserting spacers between adjacent modules. Spacers may be useful, for example, to minimize interference between neighboring WECs if this is found to be an issue in particular wave climates.

FIG. 7 also illustrates an example implementation of an active mounting that enables movement of WECs 711 and 712 along beam 721 and 722. In particular, each generator of WEC 711 or 712 is mounted on dollies with wheels which engage a track installed on top beam 721 or 722. This allows for positioning of WEC 711 and 712 along the length of beams 721 and 722 to accommodate different wavelengths as described above. Each WEC 711 or 712 can be either moved using a motorized system like a rack-and-pinion drive operated by a motor (not shown), or the lift produced by hydrofoils of WEC 711 or 712 can be used to move the WEC 711 or 712 along the track. In either case, a brake or a positive locking mechanism (not shown) such as a pin that holds the WEC in place once the desired position has been reached, may be needed.

Module 700 can further serve as a flotation device for WEC 711 and 712. With the upper and lower members of beams 721 and 722 being implemented as hollow structures, e.g., cylindrical tubes or pipes, the air inside beams 721 and 722 can be used to adjust the overall buoyancy of module 700 using these hollow structures as ballast tanks. If the overall buoyancy of module 700 is such that if the bottom tubes are filled with air their buoyancy suffices to lift the second (top) member along with WECs 711 and 712 out of the water, module 700 or WECs 711 and 712 can be serviced at sea without the need for any divers or cranes. This allows service personnel access to critical parts of module 700 such as hydrofoils, struts, generators and associated electrical infrastructure, which may be located in the top portion of the frame. In the floated state, towing the entire CycWEC module to and from a harbor or dock to the deployment site is also simplified since the hydrodynamic drag of the submerged WECs does not have to be overcome by tug boat power. In another implementation, the ballast tanks may be external to the frame structure if for example the volume available within beams 721 and 722 cannot provide sufficient buoyancy adjustment.

Figure 8:
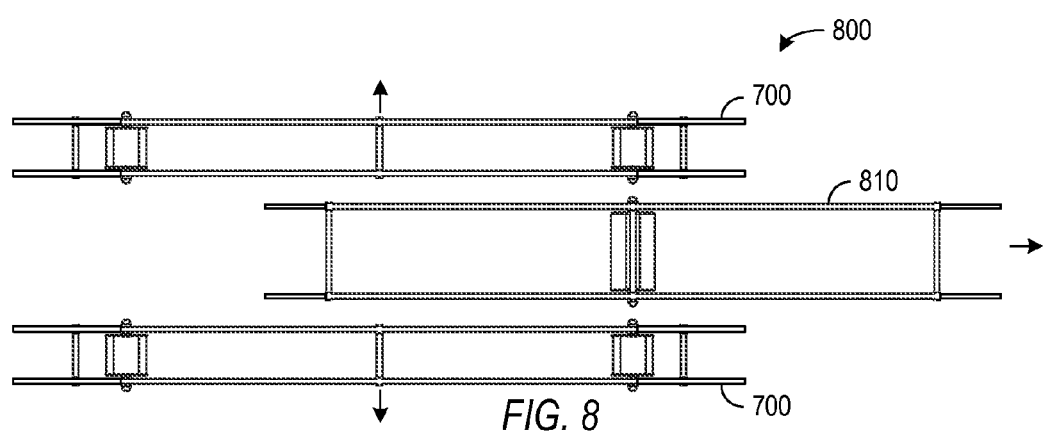
FIG. 8 illustrates how three modules in a cluster can be separated for replacement or repairs.

FIG. 8 illustrates an assembly or disassembly process of a cluster 800 including two modules 700 on which in-line WECs are mounted and a module 810 on which a central WEC is mounted. Assembly and disassembly process may be used, for example, for initial deployment of a cluster at an ocean site, for maintenance, repair, or replacement of one or more modules 700 or 810, or as part of a process to move cluster 800 to another location. For easy access, cluster 800 may be floating on the surface of the ocean as the result of pumping air into cavities with modules 700 and 810. Deployment of cluster could further involve adjusting the buoyancy of cluster 800 or connecting one or more of modules 700 or 810 to a mooring system (not shown). Disassembly may similarly require modules 700 or 810 to be disconnected from the mooring system. For example, to remove or replace a module 700 or 810, the module 700 or 810 to be removed may need to be disconnected from the mooring system, but other modules 700 or 810 do not. A disassembly process can begin by decoupling or unlocking one or both of modules 700 from module 800 and disconnecting a control system from at least a module 700 or 810 to be removed. Both modules 700 would generally need to be disconnected from module 810 for removal of module 810, but if one of modules 700 need to be removed, only the module 700 to be removed needs to be disconnected from module 810. In a larger cluster such as cluster 600 of FIG. 6A, the module to be removed would generally need to be disconnected from any modules to the immediate left or right, but full disassembly of all of the modules may not be require. Moving modules 700 in the span direction away from module 810 allows module 800 to be removed, e.g., towed out and either be serviced on site, or moved back to shore for more extensive operations requiring for example a dry dock. An assembly process can be performed by reversing the disassembly process.

Modules 700 and 800 could be standardized so that a direct swap of any of module 700 or 800 with a replacement module 700 or 800 may be performed when a module is removed for servicing. For example, for replacement of module 810, a service vessel can bring a new module 810 to the ocean site, the old module 810 can be removed for shore servicing as described above, and cluster 800 can be reassembled with the new module 810 between the old modules 700. The service vessel could then return the old module to a shore facility. Module swapping could minimize the number of trips between a service facility and a wave energy converter cluster, which may particularly be useful when the site of the cluster is relatively far from the repair facility.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A system comprising:
a first wave energy converter;
a second wave energy converter;
a third wave energy converter, wherein the third wave energy converter is larger than the first wave energy converter and larger than the second wave energy converter; and
a platform including a first mounting on which the first wave energy converter is mounted and a second mounting on which the second wave energy converter is mounted, wherein:
the first mounting is an active mounting configured to move the first wave energy converter along a first axis;
the second mounting is an active mounting configured to move the second wave energy converter along the first axis;
the third wave energy converter is mounted on the platform along the first axis and between the first wave energy converter and the second wave energy converter; and
the first, second, and third wave energy converters are cycloidal wave energy converters having respective rotation axes perpendicular to the first axis.

2. The system of claim 1, further comprising a control system connected to the first and second mountings, wherein the control system is configured to operate the first and second mounting so that a distance between the first and second wave energy converters depends on a wavelength of incident waves.

3. The system of claim 2, wherein the control system is configured to operate the first and second mountings so that the distance between the first and second wave energy converters is equal to the wavelength of the incident waves.

4. The system of claim 3, wherein the third wave energy converter is fixed mounted on the platform, and the control system operates the first mounting and the second mounting so that the third wave energy converter remains halfway between the first and second wave energy converters.

5. The system of claim 1, wherein the third wave energy converter is such that a reactive force that incident waves create on the third wave energy converter is twice a similar reactive force that the incident waves create on the first wave energy converter.

6. A system comprising:
a platform;
a first wave energy converter and a second wave energy converter mounted on the platform along a first axis of the platform;
a third wave energy converter mounted on the platform along a second axis that is parallel to and offset from the first axis, wherein the third wave energy converter is larger than the first wave energy converter and the second wave energy converter; and
a fourth wave energy converter and a fifth wave energy converter mounted on the platform along a third axis that is parallel to and offset from the first axis and the second axis.

7. The system of claim 6, wherein the first, second, fourth, and fifth wave energy converters have the same size.

8. The system of claim 6, wherein the first and second wave energy converters are smaller than the fourth and fifth wave energy converters.

9. The system of claim 6, wherein the platform comprises:
a first module that extends along the first axis, the first and second wave energy converters being mounted on the first module; and
a second module that extends along the third axis, the fourth and fifth wave energy converters being mounted on the second module, and wherein
the third wave energy converter is mounted between the first module and the second module.

10. The system of claim 9, wherein the platform further comprises a third module that is between the first and second modules, the third wave energy converter being mounted on the third module.

11. The system of claim 9, wherein the first module and the second module are units configured to be assembled into and disassembled from a cluster in while floating at an ocean site.

12. The system of claim 6, wherein the platform comprises:
a first mounting on which the first wave energy converter is mounted, wherein the first mounting is an active mounting configured to move the first wave energy converter along the first axis; and
a second mounting on which the second wave energy converter is mounted, wherein the second mounting is an active mounting configured to move the second wave energy converter along the first axis.

13. A system comprising:
a platform;
a plurality of first wave energy converters mounted in a first column and a second column on the platform;
a plurality of second wave energy converters mounted in one or more columns on the platform between the first and second columns; and
two or more third wave energy converters mounted on the platform between the first and second columns, wherein:
the first wave energy converters have a first size;
the second wave energy converters have a second size that is larger than the first size; and
the third wave energy converters have a third size that is larger than the second size.

14. The system of claim 13, wherein:
the first size is such that incident waves on each of the first wave energy converters produce reactive force with a first amplitude;
the second size is such that the incident waves on each of the second wave energy converters produce reactive force with a second amplitude that is twice the first amplitude; and
the third size is such that the incident waves on each of the third wave energy converters produce reactive force with a third amplitude that is four times the first amplitude.

15. The system of claim 13, wherein:
half of the first wave energy converters and half of the second wave energy converters are arranged in a first row on the platform;
half of the first wave energy converters and half of the second wave energy converters are arranged in a second row on the platform; and
the third wave energy converters are arranged on the platform in a third row that is between the first and second rows.

16. The system of claim 15, where in a separation between the first and third rows is one half a wavelength of incident waves and a separation between the third and second rows is one half the wavelength of the incident waves.

17. The system of claim 13, wherein the platform comprises:
a pair of first modules on which the first wave energy converters are mounted; and
one or more second modules on which the second wave energy converts are mounted.

18. The system of claim 17, further comprising two or more third modules on which the two or more third wave energy converters are respectively mounted.

19. The system of claim 17, wherein blades of the first wave energy converts have a first span, and blades of the second wave energy converters have a second span that is twice the first span.

20. The system of claim 19, wherein blades of the third wave energy converters have the second span.

21. The system of claim 20, wherein the blades of the first and second wave energy converters have a first chord, and the blades of the third wave energy converters have a second chord that is twice the first chord.

22. A method for operating a plurality of cycloidal wave energy converters that are mounted on a platform and are arranged in a cluster including a first row, a second row, and a third row, the method comprising:
determining a wavelength of incident waves;
setting separations between the first, second, and third rows according to the wavelength determined; and
operating the first, second, and third rows of the cycloidal wave energy converters so that reactive forces and torques cancel, wherein operating the first, second, and third rows of wave energy converters comprises maintaining blades of the wave energy converters at a pitch angle selected according to a characteristic of incoming waves, and wherein cancelation of the reactive forces results from differences in the areas of the blades of the wave energy converters.

23. A method for operating a plurality of cycloidal wave energy converters that are mounted on a platform and are arranged in a cluster including a first row, a second row, and a third row, the method comprising:
determining a wavelength of incident waves;
setting separations between the first, second, and third rows according to the wavelength determined; and
operating the first, second, and third rows of the cycloidal wave energy converters so that reactive forces and torques cancel, wherein
the second row is between the first and third rows, and the wave energy converters in the second row are larger than the wave energy converters in the first and third rows.

24. The method of claim 23, wherein the separation between the first row and the second row is one half of the wavelength and the separation between the second row and the third row is one half of the wavelength.

25. A method of deploying a cluster of wave energy converters, comprising:
attaching N modules of a first type to N+1 module of a second type so that each of the modules of the first type is between two adjacent modules of the second type, N being a positive integer, wherein modules of the first type include a pair of wave energy converters and modules of the second type include a single wave energy converter; and
attaching modules of a third type to the modules of the second type that are not directly connected to two of the modules of the first type, wherein modules of the third type include a pair of wave energy converters having blades that are smaller than blades in the wave energy converters in the modules of the first type.

26. The method of claim 25, wherein the wave energy converters on the modules of the second type are in M rows, and the wave energy converters on the modules of the first type and the third type are in M+1 rows, M being a positive integer, wherein each row of wave energy converters on the modules of the second type is between two adjacent rows of the wave energy converters on the modules of the first and third types.

* * * * *